(12) United States Patent
Gould et al.

(10) Patent No.: US 11,685,330 B2
(45) Date of Patent: Jun. 27, 2023

(54) ROOF MOUNTED AIRBAG MODULE

(71) Applicant: ZF Passive Safety Systems US Inc., Washington, MI (US)

(72) Inventors: Douglas Gould, Lake Orion, MI (US); Gabriela Diaz, Royal Oak, MI (US); David Varcoe, Bruce Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/382,025

(22) Filed: Jul. 21, 2021

(65) Prior Publication Data
US 2023/0024300 A1    Jan. 26, 2023

(51) Int. Cl.
*B60R 21/214* (2011.01)
*B60R 21/2165* (2011.01)

(52) U.S. Cl.
CPC ........ *B60R 21/214* (2013.01); *B60R 21/2165* (2013.01)

(58) Field of Classification Search
CPC .................... B60R 21/214; B60R 2021/23192
See application file for complete search history.

(56) References Cited

U.S. PATENT DOCUMENTS

| | | | | |
|---|---|---|---|---|
| 6,913,280 B2 * | 7/2005 | Dominissini | ......... | B60R 21/213 296/214 |
| 6,921,121 B2 * | 7/2005 | Schneider | ............. | B60J 3/0204 296/97.1 |
| 6,948,736 B2 * | 9/2005 | DePottey | .............. | B60R 21/214 280/728.2 |
| 7,597,343 B2 * | 10/2009 | Miwa | .................... | B60R 21/201 280/743.1 |
| 7,735,857 B2 * | 6/2010 | Hidaka | ................. | B60R 21/232 280/730.2 |
| 9,707,921 B2 * | 7/2017 | Fischer | ................. | B60R 21/213 |
| 11,059,449 B2 * | 7/2021 | Jayakar | ................. | B60R 21/214 |
| 11,214,217 B2 * | 1/2022 | Gould | ..................... | B60R 21/214 |
| 11,279,311 B2 * | 3/2022 | Schroeder | .............. | B60R 21/26 |
| 2004/0090050 A1 * | 5/2004 | Dominissini | ......... | B60R 21/213 280/730.1 |

(Continued)

*Primary Examiner* — Barry Gooden, Jr.
(74) *Attorney, Agent, or Firm* — Tarolli, Sundheim, Covell & Tummino L.L.P.

(57) ABSTRACT

A roof airbag module includes an airbag configured to inflate and deploy away from a vehicle roof toward a vehicle seat. The airbag module also includes an airbag housing configured to support the airbag in a stored condition in which the airbag is deflated and at least one of rolled and folded. The airbag module also includes an inflator that is actuatable to direct inflation fluid into the airbag to inflate the airbag. The airbag module further includes a module cover connected to the airbag housing and configured to conceal the airbag in the stored condition. The module cover includes a deployment door having an interior surface facing an interior of the housing and engaging the airbag in the stored condition, and an opposite exterior surface comprising a class A surface configured to be in direct view from the passenger compartment. The interior surface of the deployment door comprises one or more tear seams configured to rupture in response to airbag inflation, which opens the deployment door and releases the airbag to inflate and deploy.

12 Claims, 6 Drawing Sheets

(56) References Cited

U.S. PATENT DOCUMENTS

| | | | |
|---|---|---|---|
| 2005/0040627 A1* | 2/2005 | DePottey | B60J 3/0213 |
| | | | 280/730.1 |
| 2005/0040667 A1* | 2/2005 | Schneider | B60R 21/214 |
| | | | 296/97.12 |
| 2007/0296185 A1* | 12/2007 | Hidaka | B60R 21/213 |
| | | | 280/728.1 |
| 2010/0327567 A1* | 12/2010 | Choi | B60R 21/2176 |
| | | | 280/730.2 |
| 2012/0080869 A1* | 4/2012 | Lee | B60R 21/214 |
| | | | 280/729 |
| 2014/0097601 A1* | 4/2014 | Fu | B60R 21/214 |
| | | | 280/730.2 |
| 2017/0267204 A1* | 9/2017 | Farooq | B60R 21/231 |
| 2017/0361802 A1* | 12/2017 | Farooq | B60R 21/232 |
| 2018/0222432 A1* | 8/2018 | Schneider | B60R 21/262 |
| 2019/0217804 A1* | 7/2019 | Cho | B60R 21/233 |
| 2019/0299912 A1* | 10/2019 | Tanaka | B60R 21/233 |
| 2020/0062195 A1* | 2/2020 | Forgette | B60R 13/0206 |
| 2020/0070763 A1* | 3/2020 | Hill | B60R 21/214 |
| 2020/0086820 A1* | 3/2020 | Gould | B60N 2/01 |
| 2020/0406852 A1* | 12/2020 | Fischer | B60R 21/2338 |
| 2021/0101559 A1* | 4/2021 | Fischer | B60R 21/214 |
| 2021/0114547 A1* | 4/2021 | Fischer | B60R 21/233 |
| 2021/0268986 A1* | 9/2021 | Gould | B60R 21/215 |

\* cited by examiner

ROOF MOUNTED AIRBAG MODULE

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

A roof mounted airbag module includes an airbag housing configured to be mounted to the vehicle roof structure, an airbag attached to the airbag housing, an inflator for inflating the airbag, and a cover for closing the housing and concealing the airbag in a stored, pre-deployment condition. The cover is configured to act as a deployment door that opens in response to airbag deployment forces resulting from inflation of the airbag, which releases the airbag to inflate and deploy in the passenger compartment of the vehicle. The airbag module is configured so that the cover also forms a class A surface on the vehicle roof.

The airbag module can be configured to be mounted above/behind an overhead console on the vehicle roof. The overhead console can include features such as interior lighting, climate control vents, entertainment systems, and controls (pushbuttons, control knobs, touch screens, etc.) for controlling these features. The overhead console can include a cover or housing for supporting these features, with portions of the console cover/housing exposed to the vehicle interior forming class A surfaces in the vehicle. The airbag module can be configured such that the airbag, airbag housing, inflator, and any other component of the airbag module are concealed in the vehicle roof by the class A surfaces of the airbag cover and the console cover/housing.

Advantageously, the airbag module allows for concealing the airbag behind class A surfaces without requiring additional class A structure, such as covers, bezels, or fixtures.

A roof airbag module includes an airbag configured to inflate and deploy away from a vehicle roof toward a vehicle seat. The airbag module also includes an airbag housing configured to support the airbag in a stored condition in which the airbag is deflated and at least one of rolled and folded. The airbag module also includes an inflator that is actuatable to direct inflation fluid into the airbag to inflate the airbag. The airbag module further includes a module cover connected to the airbag housing and configured to conceal the airbag in the stored condition. The module cover includes a deployment door having an interior surface facing an interior of the housing and engaging the airbag in the stored condition, and an opposite exterior surface comprising a class A surface configured to be in direct view from the passenger compartment. The interior surface of the deployment door comprises one or more tear seams configured to rupture in response to airbag inflation, which opens the deployment door and releases the airbag to inflate and deploy.

According to one aspect, the module cover can also include a frame portion that extends around the periphery of the deployment door and is configured to connect to a rim portion of the housing. At least a portion of the tear seams can extend along a periphery of the deployment door where the deployment door meets the rim portion.

According to another aspect, the frame portion can include a planar portion configured to engage the rim portion of the housing, and a shoulder portion configured to offset the deployment door from the planar portion.

According to another aspect, the airbag module can be configured to be mounted in a vehicle overhead console and partially covered by a console cover. The shoulder portion can be configured to position the deployment door in a corresponding opening in the console cover.

According to another aspect, an exterior surface of the console cover adjacent the opening can form a class A surface that is contiguous with the class A exterior surface of the deployment door.

According to another aspect, at least a portion of the periphery of the deployment door where the deployment door meets the rim portion can be free from tear seams and forms one or more hinge portions for allowing the deployment door to open.

According to another aspect, the at least one tear seam can include a central tear seam that extends the length of the deployment door and bisects the deployment door to help define door flaps of the deployment door. Each door flap can include at least one of the hinge portions.

According to another aspect, the hinge portions of the door flaps are positioned along hinge edges of the door flaps opposite the central tear seam, the door flaps being configured to open away from each other to release the airbag.

According to another aspect, each door flap can include an upper edge and a lower edge, each of which extend from the central tear seam to the hinge edge. The module cover can include tear seams that extend along and define the upper and lower edges of the door flaps.

According to another aspect, the roof airbag module can be configured to be connected to the vehicle roof be a plurality of fasteners that extend through aligned openings in the frame portion of the module cover and the rim portion of the airbag housing. The fasteners can also be configured to be received in fastener receiving features in the vehicle roof structure to connect the airbag module to the vehicle roof.

According to another aspect, the frame portion of the module cover can include a connector configured to extend through a corresponding opening in the rim portion of the airbag housing to initially connect the module cover to the airbag housing prior to connecting the airbag module to the vehicle roof.

According to another aspect, the module cover can have a molded plastic construction.

According to another aspect, a vehicle safety system can include the roof airbag module. The vehicle safety system can also include a sensor for sensing the occurrence of an event for which airbag deployment is desired, and a controller operatively connected to the sensor and the inflator. The controller can be configured to actuate the inflator in response to the sensor sensing the occurrence of the event for which airbag deployment is desired.

DRAWINGS

The foregoing and other features will become apparent to one skilled in the art to which this disclosure relates upon consideration of the following description with reference to the accompanying drawings, in which.

DESCRIPTION

Figure 1:
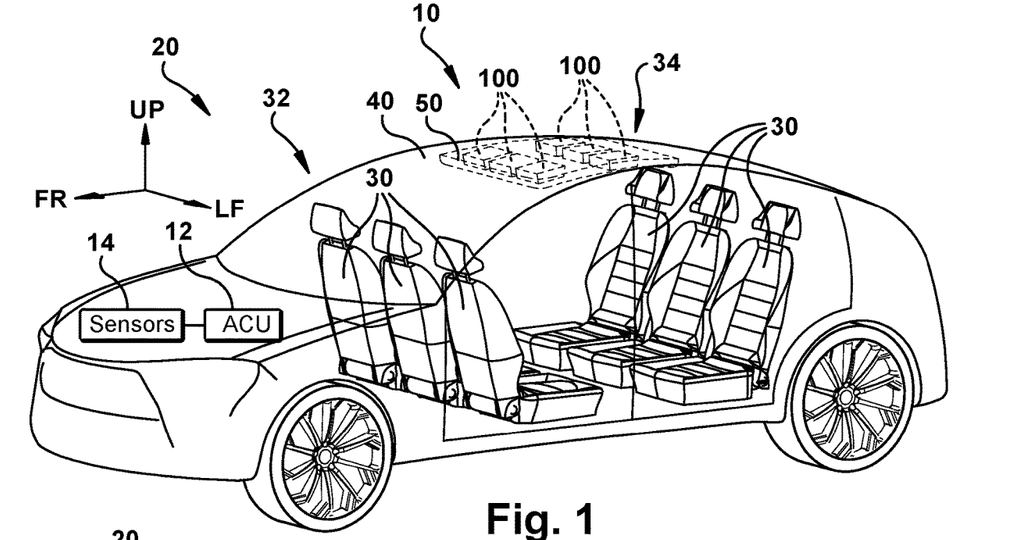
FIG. 1 is a perspective illustration depicting a vehicle including an apparatus for helping to protect occupant(s) thereof, according to an example configuration.

FIG. 1 illustrates an example configuration of a vehicle safety system 10 configured to help protect occupants (not shown) of a vehicle 20. In the example configuration of FIG. 1, the vehicle 20 is an autonomous vehicle. As such, the passenger compartment or cabin 22 is without operator controls, such as a steering wheel, pedals, instrumentation, center console, etc. Accordingly, the instrument panel can be reduced in size and/or removed altogether in order to maximize the space in the cabin. While the vehicle safety system 10 is configured for implementation in autonomous vehicles, it will be appreciated that some of the features disclosed herein can be applied to other types of vehicle where the passenger compartment or cabin 22 is without operator controls, such as a limousine.

In this description, references to up, down, left, right, front, and rear relative to the vehicle are made in accordance with the arrows in FIG. 1, which identify up (UP), front (FR), and left (LF), with their respective opposite directions being implied. In the open passenger cabin configuration illustrated in FIG. 1, vehicle seats 30 can be configured, positioned, and arranged in a variety of manners, not constrained by the need to facilitate a vehicle driver/operator. For example, in FIG. 1, the seats 30 are arranged in two rows, facing each other. More specifically, a rearward-facing front row 32 of seats 30 faces a forward-facing rear row 34 of seats. Other seating configurations, such as ones including all forward-facing seats or ones including inboard facing side rows of seats, can also be implemented. Additionally, the vehicle 20 can also include bench seating in addition to, or replacing, the illustrated bucket seating.

Each seat 30 can include conventional occupant restraints, i.e., seatbelts (not shown). For example, each seat 30 can include a conventional three-point restraint including a shoulder belt portion that extends across the occupant's shoulder, and a lap belt portion that extends across the occupant's lap.

The vehicle safety system 10 includes one or more airbag modules 100 mounted to the vehicle roof 40, for example in or behind an overhead console 50. In the example configuration of the vehicle safety system 10 illustrated in FIG. 1, there are six airbag modules 100, one associated with each vehicle seat 30. The configuration of the safety system 10 could, however, differ in this regard as, for example, a single airbag module could cover multiple seating positions.

Figure 2:
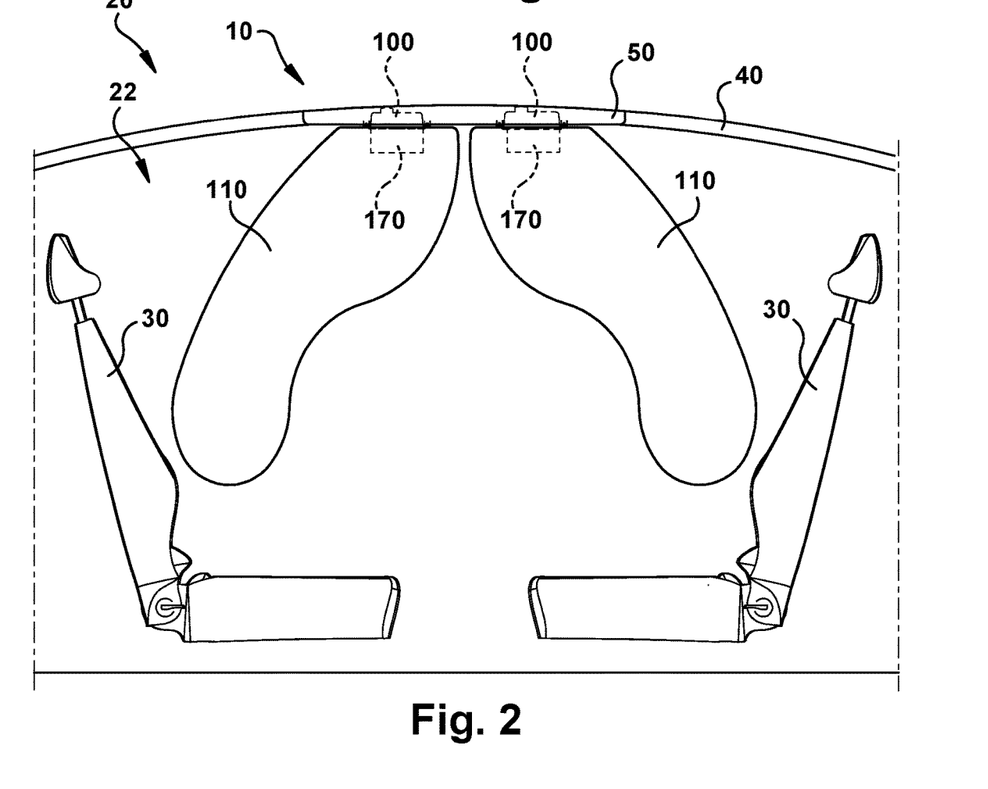
FIG. 2 is a side view of a portion of the apparatus of FIG. 1 illustrating airbags in a deployed condition.

Each airbag module includes an airbag 110 that is deployable to help protect the occupant(s) of the associated vehicle seat(s) 30. An example airbag configuration that can be implemented in the safety system 10 is illustrated in FIG. 2. As shown in FIG. 2, each airbag 110 can deploy from its respective airbag module 100 in a direction downward and toward its associated vehicle seat 30 and the occupant thereof. The shape/configuration of the airbags 110 illustrated in FIG. 2 are for purposes of example and could vary depending, for example, on factors such as the seating position/orientation, the architecture of the specific vehicle in which the safety system 10 is implemented, and the desired performance characteristics for the vehicle platform.

Figure 3:
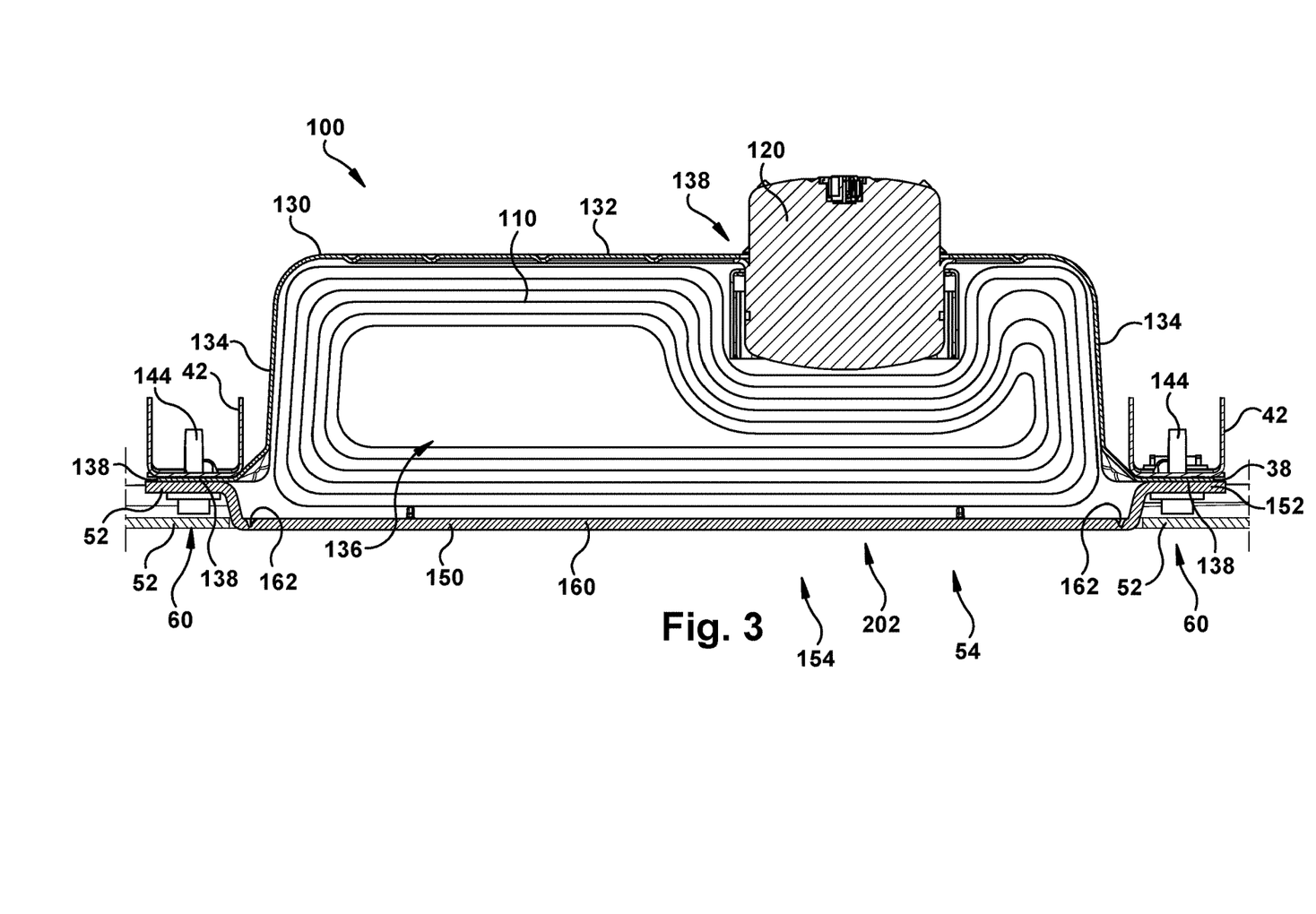
FIG. 3 is a sectional view of the airbag module taken generally along line 3-3 in FIG. 5.
Figure 4:
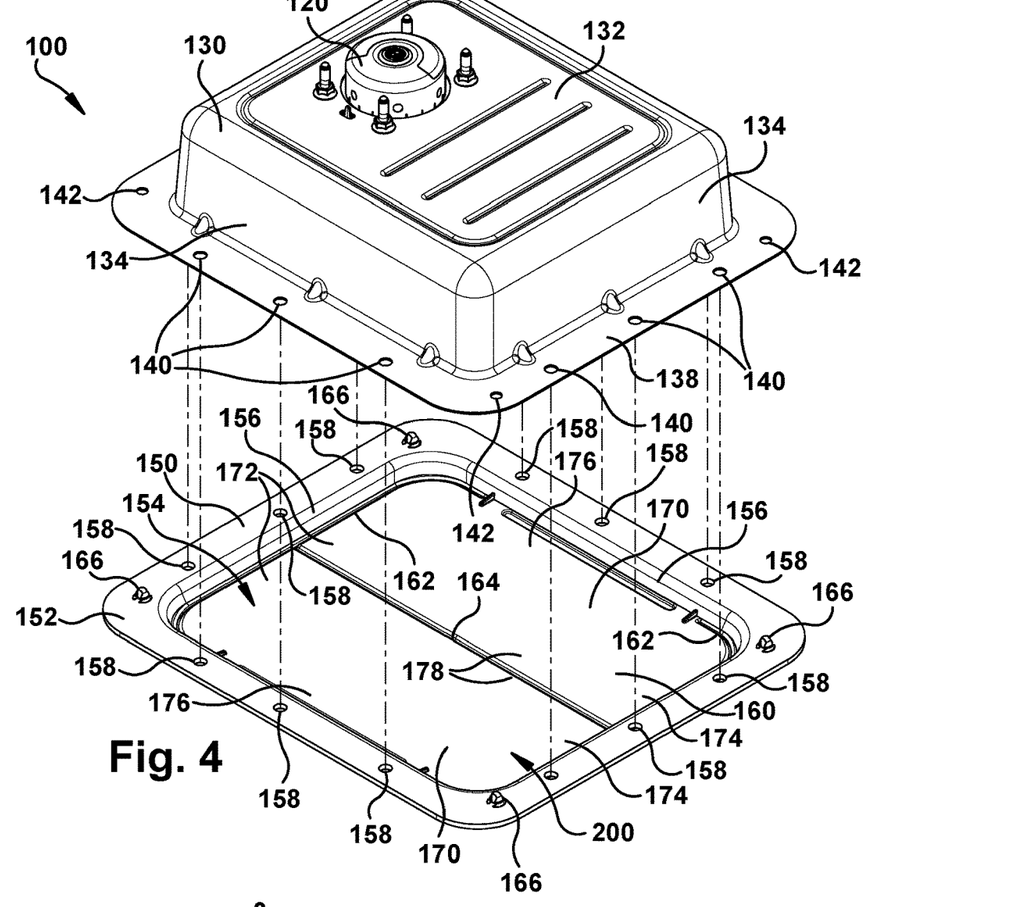
FIG. 4 is a partially exploded view of the airbag module.
Figure 5:
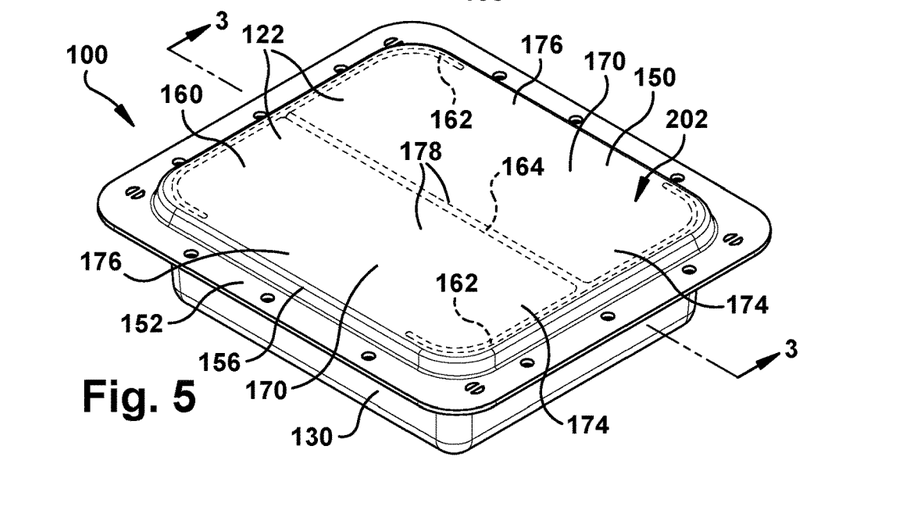
FIG. 5 is a perspective view of the airbag module.

Referring to FIGS. 3-5, in addition to the airbag 110, the airbag module 100 includes an inflator 120, a housing 130, and a cover 150. The housing 130 has a generally rectangular base wall 132 and four side walls 134 that help define an interior 136 of the housing in which the airbag 110 is stored in a rolled and/or folded condition. The housing 130 is constructed of a material, such as metal, that is generally strong and rigid. The housing 130 can, for example, have a stamped steel construction.

The base wall 132 of the housing 130 includes an opening 138 for receiving and supporting the inflator 120. The housing 130 includes an outturned flange or rim portion 138 that extends along the perimeter of the side walls 134. The rim 138 includes a plurality of fastener receiving apertures 140 spaced along its length.

The cover 150 is molded or otherwise formed at least partially from plastic and includes an generally rectangular frame portion 152 that frames or defines a generally rectangular airbag deployment opening 154. The frame portion 152 includes a planar portion with a plurality of fastener receiving apertures 158 that correspond in number and position to the fastener receiving apertures 140 on the rim portion 138 of the housing 130. The cover 150 also includes a generally rectangular deployment door portion 160 that spans the deployment opening 154. The frame portion 152 includes a shoulder portion 156 that recesses or offsets the deployment door 160 from the planar portion of the frame portion 152. The shoulder portion 156 extends along the periphery of the deployment opening 154 and interconnects the inner periphery of the frame portion 152 to the outer periphery of the deployment door 160. As shown in FIGS. 3-5, the planar portion of the frame portion 152 of the cover 150 can be sized and dimensioned to correspond to the size and dimensions of the rim portion 138 of the housing 130.

The cover 150 includes a plurality of tear seams that allow the deployment door 160 to open and release the airbag 110 for inflation and deployment. Referring to FIG. 4, the cover 150 includes a peripheral tear seam 162 that extends along the perimeter of the deployment door 160 where it meets the shoulder portion 156. The cover 150 also includes a central tear seam 164 that bisects the deployment door 164.

The tear seams 162, 164 are weakened portions of the cover 150 that rupture in response to forces exerted upon it by the inflating and deploying airbag 110. The tear seams 162, 164 can, for example, be formed as lines of reduced thickness during its manufacture, e.g., through the molding process. As shown in FIG. 3, the tear seams 162 can comprise V-shaped notches that reduce the thickness of the cover 150, creating a weakened line along which airbag deployment forces are concentrated. Although not shown in FIG. 3, the tear seam 164 can have a similar or identical structure.

The deployment door 160 is at least partially defined by the tear seams 162, 164. In the example configuration disclosed herein, the deployment door 160 is configured to have two door flaps 170 that open away from each other. Each door flap 170 has a first or upper edge 172, an opposite second or lower edge 174, a hinged edge 176, and an opposite outer edge 178.

The central tear seam 164 extends continuously along the outer edges 178 of the door flaps 170. The peripheral tear seam 162 extends continuously along the upper and lower edges 172, 174 of the door flaps 170. The peripheral tear seam 162 extends only partially along the hinged edges 176 of the door flaps 170, from the upper and lower edges 172, 174 toward each other, terminating at respective upper and lower hinges 180. The hinges 180 are full-thickness portions of the cover 150 that connect the door flaps 170 to the frame portion 152/shoulder portion 156.

A bending groove 182 extends along the hinged edges 176 between the hinges 180. The bending groove 182 weakens the material along the hinged edges 176 to facilitate bending, which allows the door flaps 170 to pivot to the opened condition. The bending groove 182 is configured to weaken the material in terms of bending but not to concentrate forces along a tear line, as is the case with the tear seams 162, 164. To achieve this function, the bending groove 182 can, for example, have a U-shape cross-sectional profile. The lengths of the hinges 180 and the bending groove 182 are selected in combination so that the hinged edges 176 exhibit a desired degree of bending resistance to the opening of the door flaps 170 while, at the same time, provide a desired degree of strength to prevent the door flaps from detaching or otherwise tearing away from the cover 150.

The cover 150 has an interior surface 200 that faces the interior 136 of the housing 130 and directly faces or contacts the airbag 110 in the assembled condition of the airbag module 100 (see FIGS. 3 and 5). The cover 150 also has an exterior surface 202, opposite the interior surface 200, that faces outward and is viewable from the exterior of the airbag module 100 (see FIG. 5). Advantageously, exterior surface 202 of the cover 160, in the area of the deployment door 160, is configured to be a class A vehicle surface.

Class A vehicle surfaces is a term of art used to describe interior vehicle surfaces that are exposed to view during normal vehicle use. For example, class A vehicle surfaces include normally visible surfaces of the instrument panel, door panels, pillars, center consoles, the vehicle roof, etc. Due to their visibility, class A surfaces necessarily must maintain a certain degree of aesthetic quality. As such, class A surfaces are typically clean and free from blemishes. Class A surfaces can also be textured to provide a desired aesthetic quality. In forming vehicle components that include class A surfaces, care is exercise so that manufacturing byproducts, such as voids, sink marks, and flow lines in molded plastic parts, are not visible on or through the class A surface.

Forming the cover 150 of the airbag module 100 with the deployment door 160 having a class A exterior surface 202 is advantageous because this single component provides the aforementioned deployment door function, without requiring any additional components for producing the desired aesthetic when the module is installed in the vehicle 20. The deployment door 160 can enclose the airbag 110 in the stored condition and open to release the airbag to inflate to the deployed condition without being encumbered by the need to move or displace any additional structure that covers the doors. The deployment door 160 can therefore be designed under more exact specifications for rupture strength, deployment resistance, etc. because there are no additional covering structures to consider. For example, an additional cover, such as a headliner, would itself be configured with rupture properties, and those properties would need to be factored in when designing the cover 150. This added level of complexity could/would negatively impact the repeatability and reliability with which the deployment door 160 opens.

To help facilitate the incorporation of the class A exterior surface 202, the deployment door 160 is configured for installation with the overhead console 50 of the vehicle 20. More specifically, the airbag module 100 and the overhead console 50 are configured so that the deployment door 160 is left exposed to the interior of the vehicle, i.e., the passenger compartment 22, through the console. This is shown in FIGS. 5-9.

The airbag module 100 is connected to structural members of the vehicle roof 40. In the example configuration of FIGS. 5-9, the airbag module 100 is connected to roof cross members 42 and sheet metal 44. The airbag module 100 is positioned with the housing 130 and enclosed by the cover 150. An overhead console housing or cover 52 is installed on the vehicle roof 40, e.g., attached to the cross members 42 and sheet metal 44 and other roof structures (not shown).

Figure 6:
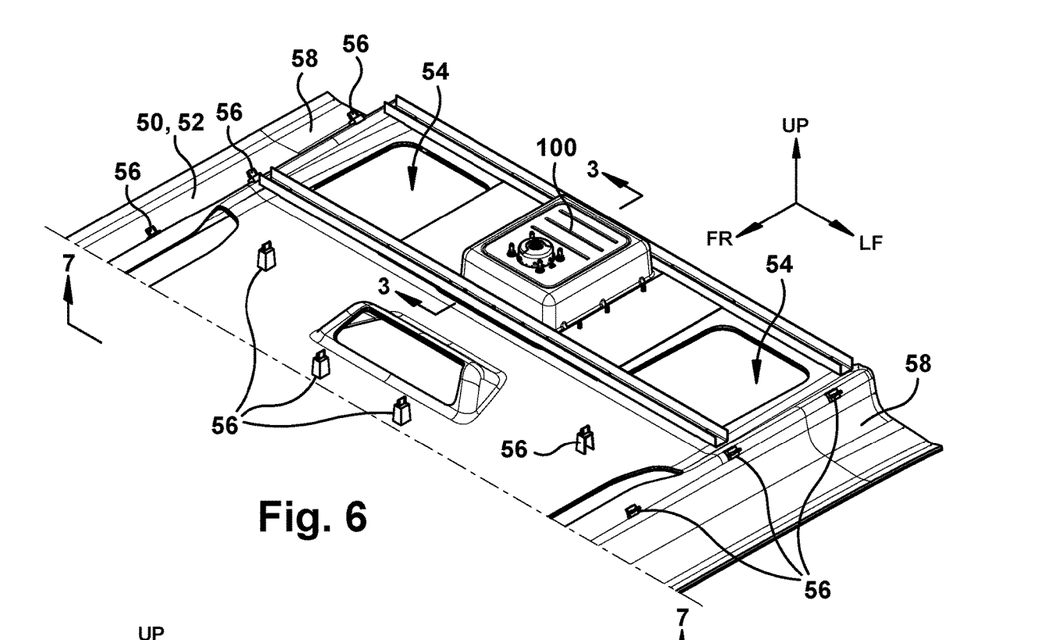
FIG. 6 is a perspective view illustrating a portion of the apparatus, in the form of an airbag module, in a vehicle assembly mounted to vehicle roof structure behind the overhead console cover.
Figure 7:
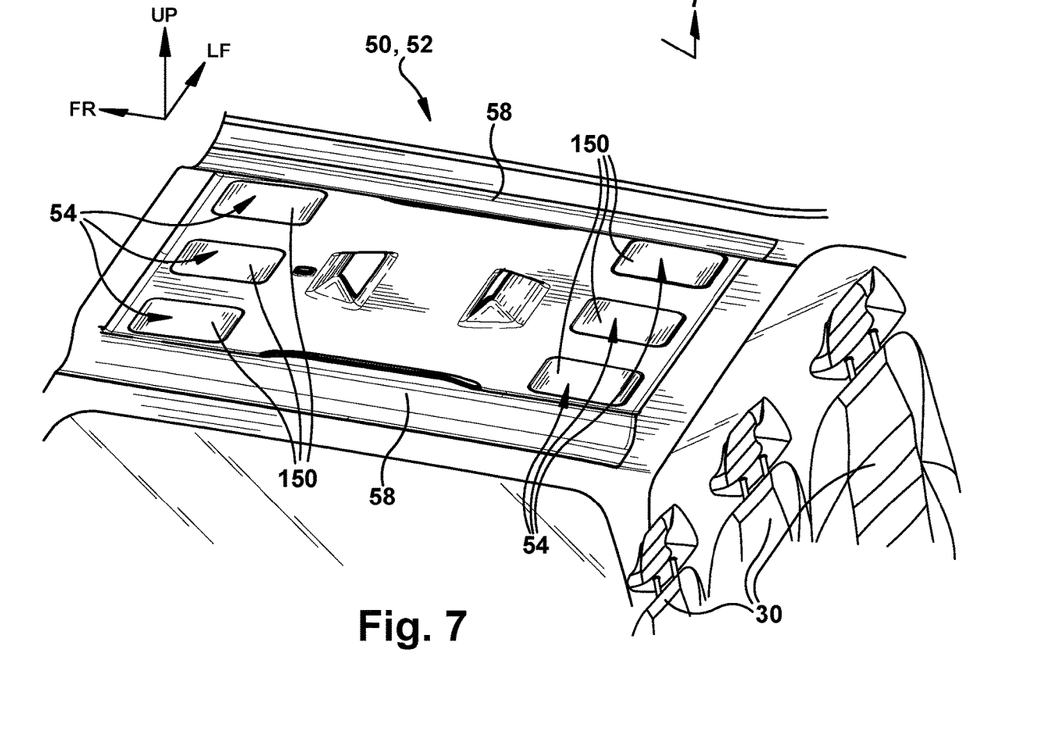
FIG. 7 is a perspective view illustrating an overhead console cover of the vehicle of FIG. 1.

As shown in FIGS. 6-7, the overhead console cover 52 can be substantially sized, that is, configured to cover, for example, a substantial portion of the vehicle roof 40 on the interior of the vehicle 20. To facilitate this connection to the roof 40, the console cover 52 can include fastening features 56, such as clips or push-in fasteners, configured to be received in corresponding roof features, such as openings, to connect the cover to the roof. The console cover 52 can be configured to span the width of the vehicle roof 40 and can include lateral portions 58 configured to extend around and cover lateral roof rails (not shown).

The overhead console 50 can serve a variety of functions in addition to housing the airbag modules 100. For example, the overhead console can include interior lighting features, climate control features, entertainment system features, air vents, etc. the console cover 52 includes six airbag openings 54 that correspond to the six airbag modules 100 that cover the six vehicle seats 30/seating positions.

Referring to FIGS. 3-5, and 8, the cover 150 is positioned on the housing 130, with the airbag 110 and inflator 120 installed therein. The frame portion 152 of the cover 150 is positioned overlying the rim portion 138 of the housing 130, with their respective fastener receiving apertures 158, 140 overlying each other. To facilitate an initial connection of the cover 150 to the housing 130, the frame portion 152 can include deflectable pins 166 that are received in corresponding openings 142 of the rim portion 138. With the cover 150 initially connected to the housing 130, the assembled airbag module 100 can be installed in the vehicle.

Figure 8:
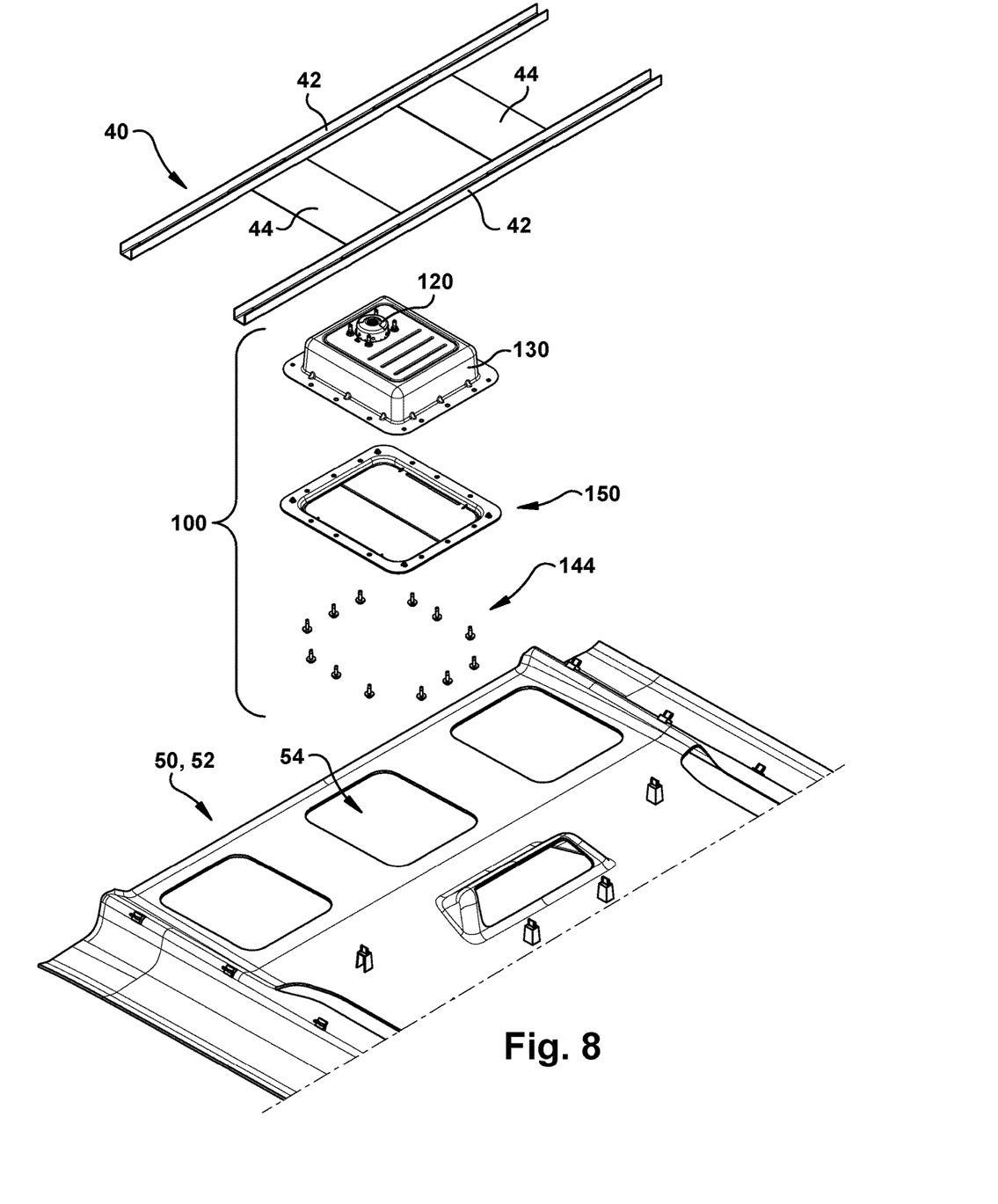
FIG. 8 is an exploded view of the vehicle assembly of FIG. 6.

The exploded view of FIG. 8 illustrates the assembly of the airbag module 100 to the vehicle roof 40 and coverage of the of the airbag module by the overhead console cover 52. To facilitate this assembly, fasteners 144 are used to both secure the assemblage of the airbag module 100 itself and to connect the airbag module to the roof 40. FIG. 8 illustrates a single airbag module 100 that is being installed in a center ones of the airbag openings 54 in the console cover 52. It will be appreciated that the same assemblage occurs at each of the six airbag module locations of the example configuration illustrated herein.

FIG. 3 illustrates in detail the connection of the airbag module 100 to the vehicle roof 40. As shown, fasteners 144 extend through the fastener apertures (not labeled in FIG. 3) in the overlying the frame portion 152 and rim portion 138. This connects the airbag module 100 to the cross members 42 and also the sheet metal (now shown in FIG. 3). With the airbag module 100 installed on the roof structure, the console cover 52 is installed on the roof structure, which positions the deployment door 160 in the airbag opening 54. As a result of this assembly, the class A exterior surface 202 of the deployment door 160 is substantially contiguous with a class A surface 60 of the console cover 52. Both of these class A surfaces 60, 202 are presented facing into the passenger compartment 22 of the vehicle. This is also shown in FIG. 9.

The safety system 10 includes an airbag controller unit (ACU) 12 that communicates with sensors 14 to detect the occurrence of an event, such as a vehicle collision, for which inflation of the airbag 110 is desired. Upon sensing, via the sensors 14, the occurrence of an event for which inflation of the airbag 110 is desired, the ACU 12 provides a deployment signal to the inflator 120. Upon receiving the signal from the ACU 12, the inflator 120 is actuated and provides inflation fluid to the airbag 110. The inflating airbag 110 exerts inflation/deployment forces on the housing 130 and the cover 150, particularly on the deployment door 160.

Figure 9:
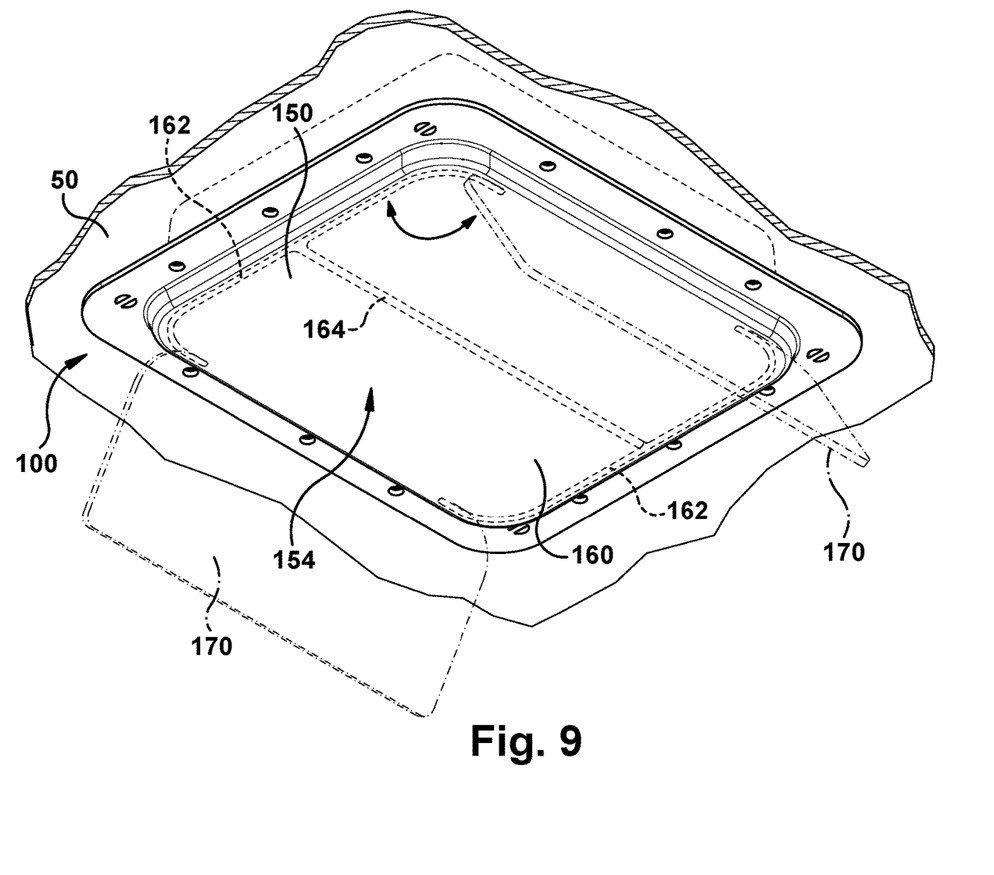
FIG. 9 is a perspective view illustrating a portion of the apparatus in pre-deployment and post-deployment conditions.

Referring now to FIG. 9, when the inflation/deployment forces reach a certain level, the deployment door 160 opens. More specifically, the tear seams 164, 164 rupture and the door flaps 170 open, as shown in dashed lines in FIG. 9, releasing the airbag to deploy through the deployment opening 154 into the passenger compartment 22 (see, e.g., FIG. 2). The airbag 110, while inflated, helps protect the vehicle occupant by cushioning impacts with the occupant and providing a desired ride down effect.

From the above description of the invention, those skilled in the art will perceive improvements, changes and modifications in the invention. Such improvements, changes and modifications within the skill of the art are intended to be covered by the appended claims.

We claim:

1. A roof airbag module comprising:
an airbag configured to inflate and deploy away from a vehicle roof toward a vehicle seat;
an airbag housing configured to support the airbag in a stored condition in which the airbag is deflated and at least one of rolled and folded;
an inflator that is actuatable to direct inflation fluid into the airbag to inflate the airbag; and
a module cover connected to the airbag housing and configured to conceal the airbag in the stored condition, wherein the module cover comprises a deployment door having an interior surface facing an interior of the housing and engaging the airbag in the stored condition, and an opposite exterior surface comprising a class A surface of an interior surface of the vehicle roof presented to the passenger compartment and configured to be in direct view from the passenger compartment, and wherein the interior surface of the deployment door comprises one or more tear seams configured to rupture in response to airbag inflation, which opens the deployment door and releases the airbag to inflate and deploy, wherein the module cover further comprises a frame portion that extends around a periphery of the deployment door and is configured to connect to a rim portion of the housing, wherein at least a portion of the tear seams extend along the periphery of the deployment door where the deployment door meets the rim portion.

2. The roof airbag module recited in claim 1, wherein the frame portion comprises a planar portion configured to engage the rim portion of the housing, and a shoulder portion configured to offset the deployment door from the planar portion.

3. The roof airbag module recited in claim 2, wherein the airbag module is configured to be mounted in a vehicle overhead console and partially covered by a console cover, wherein the shoulder portion is configured to position the deployment door in a corresponding opening in the console cover.

4. The roof airbag module recited in claim 3, wherein an exterior surface of the console cover adjacent the opening forms a class A surface that is contiguous with the class A exterior surface of the deployment door.

5. The roof airbag module recited in claim 1, wherein at least a portion of the periphery of the deployment door where the deployment door meets the rim portion is free from tear seams and forms one or more hinge portions for allowing the deployment door to open.

6. The roof airbag module recited in claim 5, wherein the at least one tear seam comprises a central tear seam that extends the length of the deployment door and bisects the deployment door to help define door flaps of the deployment door, wherein each door flap comprises at least one of the hinge portions.

7. The roof airbag module recited in claim 6, wherein the hinge portions of the door flaps are positioned along hinge edges of the door flaps opposite the central tear seam, the door flaps being configured to open away from each other to release the airbag.

8. The roof airbag module recited in claim 7, wherein each door flap includes an upper edge and a lower edge, each of which extend from the central tear seam to the hinge edge, wherein the module cover comprises tear seams that extend along and define the upper and lower edges of the door flaps.

9. The roof airbag module recited in claim 1, wherein the roof airbag module is configured to be connected to the vehicle roof by a plurality of fasteners that extend through aligned openings in the frame portion of the module cover and the rim portion of the airbag housing, the fasteners also being configured to be received in fastener receiving features in the vehicle roof structure to connect the airbag module to the vehicle roof.

10. The roof airbag module recited in claim 9, wherein the frame portion of the module cover comprises a connector configured to extend through a corresponding opening in the rim portion of the airbag housing to initially connect the module cover to the airbag housing prior to connecting the airbag module to the vehicle roof.

11. The roof airbag module recited in claim 1, wherein the module cover has a molded plastic construction.

12. A vehicle safety system comprising the roof airbag module of claim 1, a sensor for sensing an occurrence of an event for which airbag deployment is desired, and a controller operatively connected to the sensor and the inflator, wherein the controller is configured to actuate the inflator in response to the sensor sensing the occurrence of the event for which the airbag deployment is desired.

* * * * *